United States Patent [19]

Sammon et al.

[11] Patent Number: 5,799,450
[45] Date of Patent: Sep. 1, 1998

[54] VEHICLE WINDOW AND A PROCESS FOR THE PREPARATION THEREOF

[75] Inventors: Terence P. Sammon, Walled Lake; Henry W. Griffin, Bloomfield Hills; Andrew R. Kneisel, Clarkston, all of Mich.

[73] Assignee: Essex Specialty Products, Clifton, N.J.

[21] Appl. No.: 871,058

[22] Filed: Jun. 9, 1997

[51] Int. Cl.$^6$ ............................. E06B 3/00; E06B 7/00
[52] U.S. Cl. ......................... 52/208; 52/204.597; 156/108
[58] Field of Search ......................... 52/208, 204.591, 52/204.597, 468; 156/108; 296/96.21

[56] References Cited

U.S. PATENT DOCUMENTS

| | | | |
|---|---|---|---|
| 3,649,443 | 3/1972 | Domicone | 156/108 X |
| 3,654,005 | 4/1972 | Higgins et al. | 156/108 |
| 3,807,107 | 4/1974 | Davis | 52/204.59 X |
| 3,968,612 | 7/1976 | Endo et al. | 52/400 |
| 4,551,372 | 11/1985 | Kunert | 428/38 |
| 4,571,278 | 2/1986 | Kunert | 156/108 |
| 4,704,175 | 11/1987 | Kunert et al. | 156/108 |
| 4,761,916 | 8/1988 | Sanok et al. | 49/381 |
| 4,780,520 | 10/1988 | Rizk et al. | 528/53 |
| 4,839,122 | 6/1989 | Weaver | 264/129 |
| 4,879,853 | 11/1989 | Braendle et al. | 52/208 |
| 4,910,071 | 3/1990 | Kunert | 156/108 X |
| 4,986,867 | 1/1991 | Braendle et al. | 156/244.11 |
| 4,987,699 | 1/1991 | Gold | 52/204.597 X |
| 5,068,076 | 11/1991 | Weaver et al. | 264/511 |
| 5,069,852 | 12/1991 | Leone et al. | 264/171 |
| 5,095,669 | 3/1992 | Kunert et al. | 52/208 |
| 5,158,638 | 10/1992 | Osanami et al. | 156/245 |
| 5,197,243 | 3/1993 | Mozawa et al. | 52/208 |
| 5,236,650 | 8/1993 | Choby et al. | 264/135 |
| 5,330,597 | 7/1994 | Leuchten et al. | 156/108 |

*Primary Examiner*—Creighton Smith
*Attorney, Agent, or Firm*—Nemia C. Damocles

[57] ABSTRACT

A prefabricated vehicle window comprises (a) a vehicle window; (b) a substantially uncured, deformable bead of a moisture-curable adhesive material deposited along the periphery of the vehicle window; and (c) a peelable, moisture-impermeable coating covering the bead of moisture-curable adhesive material.

18 Claims, 1 Drawing Sheet

VEHICLE WINDOW AND A PROCESS FOR THE PREPARATION THEREOF

BACKGROUND OF THE INVENTION

This invention relates to the mounting or installation of vehicle windows and, more specifically to vehicle windows which are mounted or installed through the use of an adhesive.

It is known to mount vehicle windows in a vehicle through the use of an adhesive such as, for example, a moisture-curable urethane adhesive. In such a mounting procedure, the edge of the window is glued to a flange of a vehicle body. In such procedures, however, it is usually necessary to apply the moisture-curable adhesive to the window just prior to the mounting of the window, since exposure to atmospheric moisture prior to mounting will, over a period of time, cause the adhesive to cure and lose its ability to bond effectively to the vehicle flange. However, if the adhesive is applied just prior to mounting of the window, the vehicle manufacturer must purchase, operate, and maintain a substantial amount of pumping and dispensing equipment, as well as store substantial quantities of the moisture-curable adhesive. In addition, in the case of automotive windshields, the vehicle manufacturer may also need to maintain a full line of pumping and dispensing equipment to apply one or more glass primers (usually a clear primer followed by a wiping operation, followed by the application of a "blackout" primer) to the glass surface prior to the application of the moisture-curable adhesive.

It is also known to pre-apply moisture curable adhesive to a window, and then cover the adhesive with a moisture-proof foil in such a manner that the foil does not touch the bead of adhesive. The air enclosed in the foil is then evacuated and the package is filled with a dry protection gas. Upon application, the foil is completely removed to expose the uncured adhesive, as described in U.S. Pat. No. 4,879,853.

U.S. Pat. No. 4,879,853 also describes a process for pre-applying moisture curable adhesive to a window by first preparing a cured bead of adhesive adhered to the window in the shape of a receptacle for a second bead of uncured adhesive, placing a bead of moisture-curable adhesive in the receptacle which does not completely fill the receptacle, and then placing a covering over the receptacle which does not touch the uncured bead of adhesive. Upon application, the foil is completely removed from the receptacle to expose the uncured adhesive.

It would be desirable to develop a process for the pre-application of a moisture curable adhesive which does not require the use of protection gases or the removal of the cover foil during application, nor require the vehicle manufacturer to maintain a full line of pumping and dispensing equipment and a supply of adhesive and glass primers.

SUMMARY OF THE INVENTION

In one aspect, this invention is a prefabricated vehicle window comprising (a) a vehicle window;

(b) a substantially uncured, deformable bead of a moisture-curable adhesive material deposited along the periphery of the vehicle window; and (c) a peelable, moisture-impermeable coating covering the bead of adhesive material.

In a second aspect, this invention is a process for preparing a prefabricated vehicle window comprising the sequential steps of:

(a) depositing a bead of an uncured, deformable adhesive along the periphery of a vehicle window; and (b) applying a peelable, moisture-impermeable coating on the surface of the bead.

It has been discovered that the process of the invention provides a prefabricated vehicle window which does not require in its manufacture the use of a pre-formed adhesive receptacle adhered to the glass, nor the use of dry gases to prevent the adhesive from curing before it is applied to the vehicle flange. The vehicle window may be manufactured in a location remote from where it is to be installed in a vehicle, and does not require the vehicle manufacturer to maintain a full line of pumping and dispensing equipment and a supply of adhesive and glass primers.

The prefabricated vehicle windows of the present invention are suitably prepared at the glass manufacturer or sub-contractor and then shipped on a just-in-time sequence to the vehicle manufacturer until they are ready for installation.

DETAILED DESCRIPTION OF THE INVENTION

Figure 1:
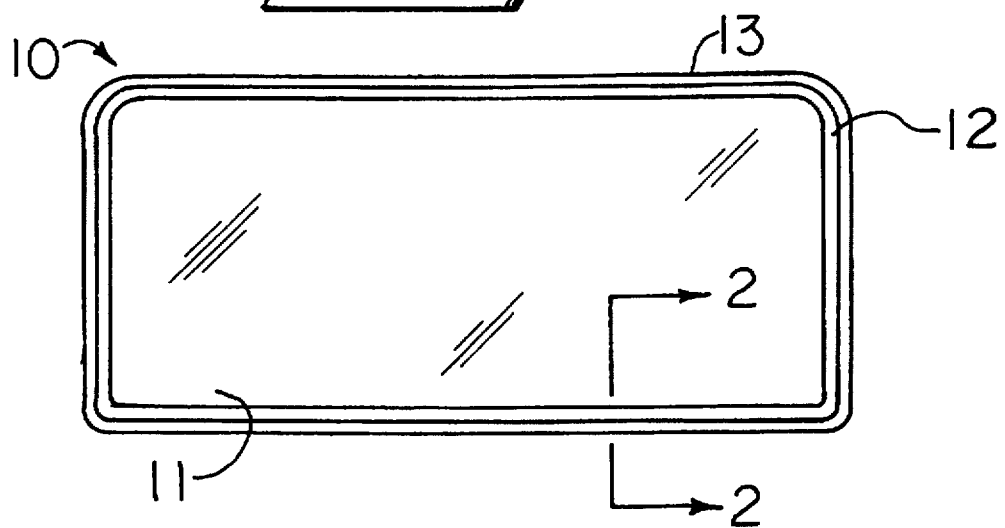
FIG. 1 is a perspective view of the prefabricated vehicle window of the invention.
Figure 2:
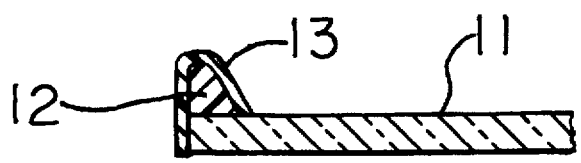
FIG. 2 is a partial cross-sectional view of the prefabricated vehicle window of the invention taken along line 2—2 of FIG. 1.
Figure 3:
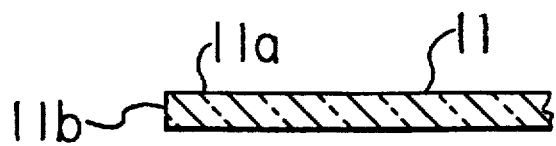
FIG. 3 shows the inner and outer surfaces and the side surface of the glass sheet shown in FIG. 2.

Referring now to the drawings, there is shown in FIG. 1 a prefabricated vehicle window 10 which is suitable for installation in an automotive vehicle as a windshield, rear window, side window, roof panel or other fixed window on a vehicle. More specifically, as shown in FIG. 2, the vehicle window 10 comprises a glass sheet 11 which may be monolithic or laminated, curved or flat, coated or uncoated, having a bead of moisture-curable adhesive 12, covered with a peelable, moisture-impermeable coating 13. Adhesive 12 is formed along at least a portion of the periphery of glass sheet 11 and extends to cover the marginal edges of the inner surface 11a and the side surfaces 11b. As used herein, the term "inner surface" refers to the surface facing the interior of the vehicle when the vehicle window is mounted on a vehicle, and the term "outer surface" refers to the surface facing the outside elements. The term "side surface" refers to the surface extending from an edge of the inner surface to an opposite edge of the outer surface of the glass and along the periphery of the glass. The term "edge" refers to the line where the inner surface or the outer surface meets the side surface. The term "marginal edge" refers to the area lying parallel to and immediately adjoining an edge. The glass sheet, as described, has four side surfaces, one outer surface and one inner surface. Each of the outer surface and the inner surface has four marginal edges.

Suitable polymers for use in the practice of the present invention in preparing the peelable, moisture impermeable coating compositions are those having a sufficiently low permeability to water vapor to prevent the exterior portion of a moisture-curable adhesive (the portion which would normally be exposed to air after deposition onto the vehicle window) from curing or "skinning over" within about twenty-four hours of the completion of the process for making the prefabricated vehicle window. Preferably, such polymers (moisture barrier polymers) have a sufficiently low permeability to water vapor to prevent such curing for at least about 7 days following the completion of the process for making the prefabricated vehicle window. Preferably, the moisture barrier polymers have a water vapor transmission rate of less than about 300 g-mil/100 in²/h at 38° C., more preferably less than about 50 g-mil/100 in²/h at 38° C. Examples of such moisture barrier polymers include vinylidene chloride copolymers, high density polyethylene, low density polyethylene and polypropylene. Generally, the peelable, moisture impermeable coating compositions can be prepared by conventional methods, such as by dissolving the moisture barrier polymers in an aqueous or organic solvent, such as, for example, toluene and tetrahydrofuran. Commercially available moisture impermeable coating compositions include the Saran latexes and Saran-F resin solutions, which are products of The Dow Chemical Company.

The amount of moisture barrier polymers which may be included in the coating composition will vary with the particular polymer used and the coating method employed. Generally, the amount would be less than about 20, preferably between about 10 and 15 percent by weight of the total composition. The coating composition may also contain conventional additives, such as dyes, pigments, heat and light stabilizers, and the like, as necessary or desired for particular applications, without adversely affecting the desirable properties of such compositions.

Preferably, the peelable, moisture impermeable coating formed from such polymers has a tensile strength which is sufficient to prevent tearing of the coating during the process for preparing the prefabricated vehicle window of the invention and during handling of the window during storage and shipment. Such coatings are also preferably thick and/or strong enough to not rupture during the process of peeling off the coating from the surface of the bead of adhesive material prior to the installation of the prefabricated window.

Suitable adhesives for use in the preparation of the prefabricated vehicle window of the invention include any moisture-curable adhesive which will effectively bond a vehicle window to a window flange. Suitable adhesives include those described in U.S. Pat. Nos. 4,551,626; 4,367,313; 4,625,012; and 5,603,798, and copending application Ser. No. 656,656, filed on May 31, 1996, all of which are incorporated herein by reference.

The preferred adhesive is a one-part urethane adhesive with excess isocyanate groups, which will cure in the presence of atmospheric moisture.

The most preferred adhesive is the latent reactive adhesive described in copending application Ser. No. 656,656 mentioned previously. This adhesive comprises predominantly of:

(a) one or more polyurethane prepolymers having blocked isocyanate groups;

(b) one or more polyurethane prepolymers formed from (i) polyols and/or polyamines and (ii) encapsulated polyisocyanates; or (c) one or more polyurethane prepolymers having radically polymerizable groups;

in which the reaction can be initiated at an activation temperature of from about 70° C. to about 90° C., and which simultaneously remains tacky and non-flowing but plastically deformable for a time sufficient for assembly.

Protective groups for blocking the isocyanate groups include hydrogen-containing compounds such as, for example, polyols, polyamines, aromatic diamines, diols, oximes, phenols and lactams. Blocking of the isocyanates is preferably achieved with aliphatic primary or secondary amines.

Radically polymerizable groups include acrylates or methacrylates such as, for example, 2-hydroxyethyl acrylate and 3-hydroxypropyl acrylate.

The encapsulated polyisocyanates are low molecular weight solid polyisocyanates which are protected by a shell of urea and cannot react at room temperature with a hydrogen-containing compound. Upon activation of the adhesive by heat, the urea shell is destroyed and the polyisocyanate is liberated and can react with a hydrogen-containing compound. Suitable solid polyisocyanates include dimeric 4,4'-diisocyanato-diphenyl methane; 3,3'-diisocyanato-4,4'-dimethyl-N,N'-diphenyl urea; trimetric isophoron diisocyanate and 1,4-phenylene diisocyanate.

The adhesive in the prefabricated vehicle window of the invention is substantially uncured. By "substantially uncured", it is meant that the adhesive has not cured to the point at which it will no longer bond effectively with a metal window flange upon removal or cutting of the adhesive film and installation of the window.

The vehicle window can be of a shape suitable for installation as a windshield, rear window, side window, roof panel or other fixed windows on a vehicle.

The vehicle window may be of any suitable size or dimension, and may be comprised of any suitable material, such as glass or a polymeric material, such as polycarbonate. Preferably, the window is comprised of glass. In addition, the window also preferably has a layer of black ceramic coating along the edge of the window on the surface which is to be bonded to the flange, for styling or cosmetic reasons. It may also be preferable to apply a layer of a silane glass primer or "wipe," and/or a layer of a glass primer, which is preferably black, along the edge of the window on the surface which is to be bonded to the window opening flange, to promote the adhesion of the window to the flange, and/or, in the case of a black primer, to provide protection from ultraviolet rays for the adhesive if an adhesive which needs such protection is used.

The bead of adhesive may be deposited along the periphery of a vehicle window by any suitable means, such as adhesive extruders or dispensers commonly used in the application of urethane adhesives for vehicle window bonding applications and is preferably deposited in a nitrogen atmosphere to prevent the moisture curing of the adhesive. Preferably, the bead of adhesive is large enough to provide sufficient adhesion between the glass and a metal substrate, such as a window flange, after application of the vehicle window to the flange and curing of the adhesive. The bead of adhesive is preferably extruded in a roughly triangular shape, with the height of the bead being approximately 10 mm, and the width of the bead in the range of from about 5 mm to about 5 cm, more preferably in the range of from about 14 to about 18 mm.

After the bead of adhesive 12 (uncured) is deposited along the periphery of the vehicle window, a peelable, moisture-impermeable coating 13 is applied to the surface of the bead by any means known in the art, such as spraying, or flow-coating. By the term "flow-coating" is meant using a "duck bill" type nozzle out of which the coating material flows during the coating process. Preferably, the peelable, moisture-impermeable coating is applied to the surface of the bead within two minutes after the bead has been deposited. Preferably the moisture-impermeable coating is applied by spraying, during which the direction of the sprayed coating is controlled and concentrated to the surface of the adhesive bead. The moisture-impermeable coating covering the bead of uncured adhesive prevents the adhesive from curing for a period of at least about 7 days following the completion of the process for making the prefabricated window.

The prefabricated window with the adhesive can then be shipped to the vehicle manufacturer where it can be stored until it is ready for installation.

In the plant, when the prefabricated vehicle window is to be bonded to the vehicle flange (that is, to the substrate which forms the vehicle window opening), it will be necessary to remove the peelable moisture-impermeable coating in order to allow the adhesive to come into contact with the flange.

Removing the moisture-impermeable coating can be done by means known in the art, such as by peeling it off by hand or by mechanical means. The vehicle window can then be installed onto a vehicle by pressing the adhesive against the vehicle flange while the adhesive is still in its "substantially uncured" state. By "substantially uncured," it is meant that the adhesive has not cured to the point at which it no longer bonds effectively with a metal window flange upon removal of the moisture-impermeable coating. For example, the coating may be removed manually by peeling it off.

Although the invention has been described with respect to specific preferred embodiments thereof, many variations and modifications will become apparent to those skilled in the art.

What is claimed is:

1. A prefabricated vehicle window comprising
   (a) a vehicle window;
   (b) a substantially uncured, deformable bead of a moisture-curable adhesive material deposited along a periphery of the vehicle window; and
   (c) a peelable, moisture-impermeable coating covering the bead of moisture-curable adhesive material.

2. The prefabricated window of claim 1 wherein the adhesive material is a latent reactive adhesive comprising predominantly a prepolymer selected from the group consisting of:
   (a) at least one polyurethane prepolymer having blocked isocyanate groups;
   (b) at least one polyurethane prepolymer formed from (i) polyols and (ii) encapsulated polyisocyanates;
   (c) at least one polyurethane prepolymers having radically polymerizable groups;
   (d) at least one polyurethane prepolymer formed from (i) polyamines and (ii) encapsulated polvisocyanates; and
   (e) at least one polyurethane prepolymer formed from (i) polyols and polyamines and (ii) encapsulated polyisocyanates:
   in which the reaction is initiated at an activation temperature of from about 70° C. to about 90° C., and which simultaneously remains tacky and non-flowing but plastically deformable for a time sufficient for assembly.

3. The prefabricated window of claim 1 wherein the adhesive material is a hot melt adhesive with a softening point above 80° C.

4. The prefabricated window of claim 1 wherein the peelable moisture-impermeable coating is formed from a solution of a moisture barrier polymer in a solvent selected from the group consisting of aqueous solvent and organic solvent.

5. The prefabricated window of claim 4 wherein the moisture barrier polymer has a water vapor transmission rate of less than about 300 g-mil/100 in$^2$/h at 38° C.

6. The prefabricated window of claim 4 wherein the moisture barrier polymer has a water vapor transmission rate of less than about 50 g-mil/100 in$^2$/h at 38° C.

7. The prefabricated window of claim 4 wherein the moisture barrier polymer is selected from the group consisting of vinylidene chloride copolymer, high density polyethylene, low density polyethylene and polypropylene.

8. The prefabricated window of claim 4 wherein the peelable moisture-impermeable coating is formed from a solution of a vinylidene chloride copolymer in an aqueous solvent.

9. The prefabricated window of claim 4 wherein the peelable moisture-impermeable coating is formed from a solution of a vinylidene chloride copolymer in a solvent selected from the group consisting of toluene and tetrahydrofuran.

10. A process for preparing a prefabricated vehicle window comprising the sequential steps of:
    (a) depositing a bead of an uncured, deformable adhesive material along a periphery of a vehicle window; and
    (b) applying a peelable, moisture-impermeable coating on the surface of the bead.

11. The process of claim 10 wherein the adhesive material is a latent reactive adhesive comprising predominantly a prepolymer selected from the group consisting of:
    (a) at least one polyurethane prepolymer having blocked isocyanate groups;
    (b) at least one polyurethane prepolymer formed from (i) polyols and (ii) encapsulated polyisocyanates;
    (c) at least one polyurethane prepolymer having radically polymerizable groups;
    (d) at least one polyurethane prepolymer formed from (i) polyamines and (ii) encapsulated polvisocyanates: and
    (e) at least one polyurethane prepolymer formed from (i) polyols and polyamines and (ii) encapsulated polyisocyanates;
    in which the reaction is initiated at an activation temperature of from about 70° C. to about 90° C., and which simultaneously remains tacky and non-flowing but plastically deformable for a time sufficient for assembly.

12. The process of claim 10 wherein the adhesive material is a hot melt adhesive with a softening point above 80° C.

13. The process of claim 10 wherein the peelable moisture-impermeable coating is formed from a solution of a moisture barrier polymer in a solvent selected from the group consisting of aqueous solvent and organic solvent.

14. The process of claim 13 wherein the moisture barrier polymer has a water vapor transmission rate of less than about 300 g-mil/100 in$^2$/h at 38° C.

15. The process of claim 13 wherein the moisture barrier polymer has a water vapor transmission rate of less than about 50 g-mil/100 in$^2$/h at 38° C.

16. The process of claim 13 wherein the moisture barrier polymer is selected from the group consisting of vinylidene chloride copolymer, high density polyethylene, low density polyethylene and polypropylene.

17. The process of claim 10 wherein the peelable moisture-impermeable coating is formed from a solution of a vinylidene chloride copolymer in an aqueous solvent.

18. The process of claim 10 wherein the peelable moisture-impermeable coating is formed from a solution of a vinylidene chloride copolymer in a solvent selected from the group consisting of toluene and tetrahydrofuran.

* * * * *